United States Patent
Aubin et al.

(10) Patent No.: US 11,970,196 B2
(45) Date of Patent: Apr. 30, 2024

(54) DEVICE AND METHOD OF MANAGING THE ELECTRICAL ENERGY CONSUMPTION OF A SET OF PASSENGER TRANSPORT VEHICLES

(71) Applicant: Faiveley Transport Tours, Saint-Pierre-des-Corps (FR)

(72) Inventors: Philippe Aubin, Chanceaux sur Choisille (FR); Fabrice Lamide, Montlouis sur Loire (FR)

(73) Assignee: FAIVELEY TRANSPORT TOURS, Saint-Pierre-des-Corps (FR)

( * ) Notice: Subject to any disclaimer, the term of this patent is extended or adjusted under 35 U.S.C. 154(b) by 150 days.

(21) Appl. No.: 17/614,713

(22) PCT Filed: Jun. 3, 2020

(86) PCT No.: PCT/FR2020/050947
§ 371 (c)(1),
(2) Date: Nov. 29, 2021

(87) PCT Pub. No.: WO2020/245541
PCT Pub. Date: Dec. 10, 2020

(65) Prior Publication Data
US 2022/0194447 A1 Jun. 23, 2022

(30) Foreign Application Priority Data

Jun. 6, 2019 (FR) ...................................... 1906026

(51) Int. Cl.
*G05D 1/00* (2006.01)
*B61D 27/00* (2006.01)
(Continued)

(52) U.S. Cl.
CPC .......... *B61L 27/16* (2022.01); *B61D 27/0018* (2013.01); *B61L 27/57* (2022.01)

(58) Field of Classification Search
CPC ..... B61L 27/16; B61L 27/57; B61D 27/0018; B61D 27/00; Y02T 30/00; G06Q 10/04; G06Q 50/06; G05D 1/00
(Continued)

(56) References Cited

U.S. PATENT DOCUMENTS

2010/0222929 A1* 9/2010 Ostermeier ........ B60H 1/00778
700/276
2015/0191090 A1* 7/2015 Sawa ........................ B60L 7/14
701/19
(Continued)

FOREIGN PATENT DOCUMENTS

FR          3011912 A1    4/2015
WO     WO-2015055922 A1 * 4/2015  ......... B60H 1/00778

OTHER PUBLICATIONS

International Search Report dated Aug. 10, 2020 for corresponding Application No. PCT/FR2020/050947 (4 pages).
(Continued)

*Primary Examiner* — Shardul D Patel
(74) *Attorney, Agent, or Firm* — Christopher R. Carroll; The Small Patent Law Group LLC

(57) ABSTRACT

A device for managing the electrical energy consumption of a set of passenger transport vehicles comprises: —means for receiving a set of consumption information representative of the electrical energy consumed at a given time by the vehicles, —means for determining an overall consumption, from the consumption information received, and —means for generating a set of commands intended respectively for a subset of vehicles selected from among the vehicles of the set according to the service status thereof, the commands being generated to modify the operation of at least one air conditioning system of the vehicles so as to reduce the value of the determined overall consumption to a predefined value. The invention is applicable in passenger transport vehicles
(Continued)

powered by an electrical network, such as rail transport vehicles, for example trains, subways, trams, trolleybuses, etc.

20 Claims, 3 Drawing Sheets

(51) Int. Cl.
 *B61L 27/16* (2022.01)
 *B61L 27/57* (2022.01)
(58) Field of Classification Search
 USPC .......................................................... 701/19
 See application file for complete search history.

(56) References Cited

U.S. PATENT DOCUMENTS

2016/0075350 A1* 3/2016 Becker .................... B60L 1/003
 701/19
2016/0264077 A1* 9/2016 Abousleiman .......... B60L 1/003
2017/0334264 A1* 11/2017 Huaulme ............ B60H 1/00428

OTHER PUBLICATIONS

English Translation of the International Search Report dated Aug. 10, 2020 for corresponding Application No. PCT/FR2020/050947 (3 pages).
EKE-Electronics Ltd. "EKE—Trainnet Presentation—Complete Video" YouTube, Apr. 20, 2016 (Apr. 20, 2016), pp. 1-1, Retrieved from the Internet: https ://www.youtube.com/watch ?v=AJ98-kegSis; XP054980233; Retrieved on Feb. 19, 2020.
Anonymous. "EKE—Technology for smarter trains" Jun. 12, 2019 (Jun. 12, 2019), pp. 1-68, Retrieved from the Internet: https ://www .eke-electronics.com/images/eke/Brochur e/EKE_Trainnet_Brochure. pdf; XP055669843; Retrieved on Feb. 18, 2020.
Benoît Robyns et al, "Smart grid in railway system", Sep. 29, 2017 (Sep. 29, 2017), p. 1-21, Retrieved from the Internet: https://www. etip-snet.eu/wp-content/uploads/2017/06/4-The-Conifer-and-Massena-Project-Guillaume-Gazaignes-and-Benoît-Robyns.pdf, XP055668934; Retrieved on Feb. 14, 2020.

* cited by examiner

DEVICE AND METHOD OF MANAGING THE ELECTRICAL ENERGY CONSUMPTION OF A SET OF PASSENGER TRANSPORT VEHICLES

CROSS-REFERENCE TO RELATED APPLICATIONS

This application is a national phase entry of International Patent Application No. PCT/FR2020/050947 (filed 3 Jun. 2020), which claims priority to French Patent Application No. 1906026 (filed 6 Jun. 2019). The entire disclosures of these applications are incorporated herein by reference.

BACKGROUND

Technical Field

The present invention concerns a device for managing the electrical energy consumption of a set of passenger transport vehicles, such as rail vehicles.

It concerns a method of managing the electrical energy consumption of a set of passenger transport vehicles.

The invention applies in particular to fleets of vehicles for rail transport for example such as trains, subways, tramways, trolleybuses, etc., supplied by an electricity network.

Discussion of Art

The transport of passengers, and in particular rail transport, is one of the largest consumers of electricity produced by energy production centers and conveyed by an electricity network to electricity consumers.

Ideally, the electrical energy produced by the energy production centers must be equal to the electrical energy consumed by all the electricity consumers. To attain this objective, energy consumption predictions are made, for example daily, in particular for the major electricity consumers such as the transport sector, steel manufacture, etc. According to the predictions, the production of electrical energy by the energy production centers as well as the management of deviations in consumption from the predicted consumption, are planned by the company managing the electricity network.

As the transport of passengers, and in particular rail transport, is one of the largest consumers of electricity, there is a need to optimize the predictions of electrical energy consumption in order to limit as best as possible its impact on the electricity network.

In a passenger transport vehicle, such as a rail vehicle, the air conditioning system is the equipment that is the highest electrical energy consumer after the vehicle propulsion system. As the electrical energy consumed by the air conditioning is variable depending on the seasons and weather variations at particular times, it is sometimes difficult to predict the electrical energy consumption for an entire fleet of vehicles. When the fleet of vehicles consumes a quantity of energy greater than the predictions, the company operating the fleet is penalized by the company managing the electricity network, in particular when the consumption is made during critical periods, such as periods having consumption peaks.

BRIEF SUMMARY

The present invention is directed to improving the management of electrical energy used by a fleet of vehicles, such as rail vehicles, without however affecting the comfort of the passengers.

To that end, according to a first aspect, the present invention concerns a device for managing the electrical energy consumption of a set of passenger transport vehicles.

According to the invention, the management device comprises:
- reception means for receiving a set of consumption information representing the electrical energy consumed at a given instant by the vehicles of the set,
- determining means for determining an overall consumption at a given instant, from the set of consumption information received, and
- generation means for generating a set of commands respectively provided for a subset of vehicles selected from the set of vehicles according to their state of use, the commands being generated to modify the operation of at least one air conditioning system of the vehicles of the subset so as to reduce the value of the determined overall consumption to a predefined value.

Thus, the management device centralizes the generation of commands for the air conditioning of all the vehicles of a fleet taking into account their state or their situation of use, that is to say considering whether the vehicle is in use or not, and if it is in use, considering whether it is in passive use (waiting, without passengers on board, for example in parking mode) or in active use (with passengers on board).

It is considered that a vehicle is in use when it is electrically energized, that is to say when it consumes electrical energy from the electricity network, the systems on board being supplied by the electricity network.

Furthermore, it is considered that a vehicle is not in use, when it is electrically de-energized, that is to say that it does not consume electrical energy, the equipment on board not being supplied by the electricity network.

More particularly, the commands are generated to modify if possible the operation of the air conditioning systems of some vehicles of the fleet so as to reduce the overall electricity consumption of the fleet in real time to a predefined value, this predefined value being established by the company managing the electricity network.

The commands generated by the generation means are solely provided to the vehicles of a subset of vehicles corresponding to the vehicles eligible for load management or capable of reducing their electrical energy consumption without impacting the operations of the fleet.

It will be noted that, in known manner, an air conditioning system comprises regulating means configured to maintain the temperature of a cabin at a setpoint temperature, whether it be to heat or cool the cabin. In general, temperature sensors measure the temperature of the cabin. This measured temperature is then compared to the setpoint temperature to activate or not activate actuators of the air conditioning system, depending on the result of the comparison, enabling the cabin to be heated or cooled, as the case may be, for it to attain the setpoint temperature.

Therefore, the actuators (or contactors) of the air conditioning system are activated for a duration over a period of time corresponding to the period of activation of the actuator. The period of the actuator may be defined as a period of time elapsed between the triggering of two consecutive activations of the actuator.

The duty cycle of an actuator of the air conditioning system may thus be defined as the duration during which the actuator is activated, as a percentage of the duration of an activation period of the actuator.

When an actuator of the air conditioning system is activated according to a determined duty cycle, it is said that the actuator is activated according to a determined activation profile.

Therefore, to modify the operation of an air conditioning system so as to reduce the consumption of a vehicle constitutes reducing the activation profile of the actuator or reducing the duty cycle of the activation of the actuator. As a matter of fact, if the duration for which the actuator is activated is reduced, the consumption of the air conditioning system, and thus of the vehicle, is reduced.

Thus, to reduce the consumption of a set of vehicles, without however reducing the comfort of the vehicle passengers, the activation profile of the actuators of the air conditioning system of each vehicle of the set is reduced or not reduced, according to the state of use of each vehicle.

According to a feature, the management device further comprises transmission means for sending a request for reduction of the electrical energy consumption to the vehicles of the set, the consumption information being received in response to the transmission of the reduction request.

Thus, the management device sends a request for reduction of the electricity consumption to the vehicles of the set, for example in response to an instruction from the company managing the production and transport of electrical energy to the electrical energy consumer to reduce the consumption or load management.

The vehicles of the fleet receiving this request send consumption information at a given instant, to the control device, enabling it to determine the overall consumption of the fleet of vehicles at a given instant.

In one embodiment, the consumption information comes from a set of local control devices respectively associated with a set of air conditioning systems on board vehicles of the fleet, as will be described below.

More particularly, as the management device receives the consumptions of each vehicle and knows the state of use of each vehicle, it can estimate the possible load management for each vehicle of the fleet of vehicles to attain the predefined electricity consumption value. The control device generates the corresponding commands accordingly.

According to a feature, the subset of vehicles comprises vehicles which are in passive use or in active use.

Thus, the vehicles eligible for load management or able to participate in the consumption reduction of the fleet of vehicles are vehicles in use, whether that use be passive (that is to say that the vehicle is on standby and without passengers on board, for example is parked), or active (that is to say with passengers on board).

According to a feature, the management device is furthermore configured to select the vehicles of a subset according to information on the temperature of at least one cabin of the vehicles.

Thus, the vehicles to which the commands are sent are selected taking into account, in addition to the state of use of the vehicles, the temperature of at least one cabin of the vehicles. This makes it possible to better satisfy the passengers' comfort.

According to embodiments, the information on the temperature of at least one cabin may comprise a temperature measured in said at least one cabin or a parameter indicating that a setpoint temperature has been reached in said at least one cabin.

According to a feature, the management system further comprises identification means for identifying, from among the subset of selected vehicles, a first group of vehicles comprising vehicles in a passive state of use and a second group of vehicles comprising vehicles in an active state of use and in which the information on the temperature of at least one cabin indicates that the setpoint temperature has been reached.

According to a feature, the generation means are configured to generate a first group of commands for reduction of the activation profile of the air conditioning system provided for the first group of vehicles such that the gap between the temperature of the vehicle and a regulation temperature has a first predefined value, and a second group of commands for reduction of the activation profile of the air conditioning system provided for the second group of vehicles, such that the gap between the temperature of the vehicle and a regulation temperature has a second predefined value, the second predefined value being less than the first predefined value.

Thus, when the regulation temperature or setpoint temperature is reached in a cabin of a vehicle in active use, that is to say transporting passengers, the activation profile of the actuators of the air conditioning system may be reduced by a few percentage units, for example by 5%. In other words, the activation profile is reduced moderately in order to obtain a gap between the temperature of the cabin and the setpoint temperature of a low value, for example of the order of 1 to 2 degrees Celsius.

Furthermore, if the vehicle is in passive use, that is to say parked or empty, the activation profile of the actuators of the air conditioning system may be reduced by a few percentage units, for example between 20 and 30%. In other words, the activation profile is reduced significantly in order to obtain a gap between the temperature of the cabin and the setpoint temperature of a high value, for example of the order of 5 degrees Celsius.

It will be noted that by reducing the activation profile, the duty cycle of the activation period of the actuators of the air conditioning system is reduced.

Thus, as the electrical energy consumption of the vehicles of the subset is reduced, the electrical energy consumption of the fleet of vehicles is reduced.

According to one embodiment, the management device is placed on the ground.

In other embodiments, the management device is placed in one of the vehicles of the set.

The management device comprises communication means for communicating, not only with the vehicles of the set, but also with the servers of the company managing the production and transport of the electrical energy.

According to a second aspect, the present invention concerns a system for managing the electrical energy consumption of a set of passenger transport vehicles.

According to the invention, the management system comprises a management device in accordance with the invention as well as local control devices respectively associated with air conditioning systems on board the passenger transport vehicles, each local control device being configured to measure and send consumption information to the management device that represents the electrical energy consumed at a given instant by the associated air conditioning system.

The local control devices determine the electrical energy consumption linked to the associated air conditioning system, and send the determined electrical energy consumption to the electrical energy consumption management device. The management device thus receives consumption information on the vehicles, which enables it to determine the overall consumption of the fleet of vehicles.

According to a third aspect, the present invention concerns a management method for managing the electrical energy consumption of a set of passenger transport vehicles.

According to the invention, the management method comprises the following steps implemented in a management device:
- receiving a set of consumption information representing the electrical energy consumed at a given instant by the vehicles of the set,
- determining an overall consumption at a given instant, from the set of consumption information received, and
- generating a set of commands provided respectively for a subset of vehicles selected from the vehicles of the set according to their state of use, said commands being generated to modify the operation of the air conditioning system of the vehicles of the subset, so as to reduce the determined overall consumption value to a predefined value.

The commands generated are provided to the vehicles of the subset, these vehicles constituting the vehicles eligible for the load management or able to reduce their electrical energy consumption.

According to a feature, the management method comprises transmitting to the vehicles of the set a request for reducing the electrical energy consumption, the step of receiving the set of consumption information being implemented in response to the transmission of the reduction request.

According to a feature, the selected subset of vehicles comprises vehicles which are in passive use or in active use.

According to a feature, the vehicles of the subset of vehicles are selected furthermore according to information on the temperature of at least one cabin of the vehicles of the set.

According to a feature, the management method further comprises identifying, from among the subset of selected vehicles, a first group of vehicles comprising vehicles in a passive state of use and a second group of vehicles comprising vehicles in an active state of use and in which the information on the temperature of at least one cabin indicates that the setpoint temperature has been reached.

According to a feature, the generating step comprises the generation of a first group of commands for reduction of the activation profile of the air conditioning system provided for the first group of vehicles such that the gap between the temperature of the vehicle and a setpoint temperature has a first predefined value, and a second group of commands for reduction of the activation profile of the air conditioning system provided for the second group of vehicles, such that the gap between the temperature of the vehicle and a setpoint temperature has a second predefined value, the second predefined value being less than the first predefined value.

According to a fourth aspect, the present invention concerns a set of passenger transport vehicles, each vehicle comprising at least one air conditioning system and an associated local control device, the electricity consumption of said set of vehicles being managed by a management device in accordance with the invention implementing a management method in accordance with the invention.

The method of managing the electrical energy consumption, the system for managing the electrical energy consumption and the set of passenger transport vehicles have features and advantages similar to those described earlier in relation to the electrical energy consumption management device.

Still other particularities and advantages of the invention will appear in the following description.

BRIEF DESCRIPTION OF THE DRAWINGS

In the accompanying drawings, given by way of non-limiting example.

DETAILED DESCRIPTION

The invention finds an application in the field of passenger transport vehicles supplied by an electricity network, in particular in rail transport vehicles, whether they be dedicated to traveling long distances or short distances, such as vehicles for urban rail transport, for example such as subways and tramways.

The invention applies in particular to a fleet or set of passenger transport vehicles, each vehicle comprising at least one air conditioning system.

In general, a rail type passenger transport vehicle is equipped with several air conditioning systems. The air conditions of each cabin of the passenger transport vehicle are regulated by an air conditioning system. For example, in a rail vehicle, each wagon has an air conditioning system regulating its own air conditions. In other examples, a same air conditioning system can regulate the air conditions of several vehicles.

In the interest of simplicity, it is considered in this document that each passenger transport vehicle of a fleet of vehicles comprises a single air conditioning system. Nevertheless, as indicated above, a vehicle may comprise several air conditioning systems. For example, a vehicle could comprise as many air conditioning systems as cabins.

Therefore, in what follows, an air conditioning system of a vehicle refers to an air conditioning system associated with at least one vehicle cabin. Furthermore, the temperature of a vehicle refers to the temperature of at least one cabin of the vehicle.

Figure 1:
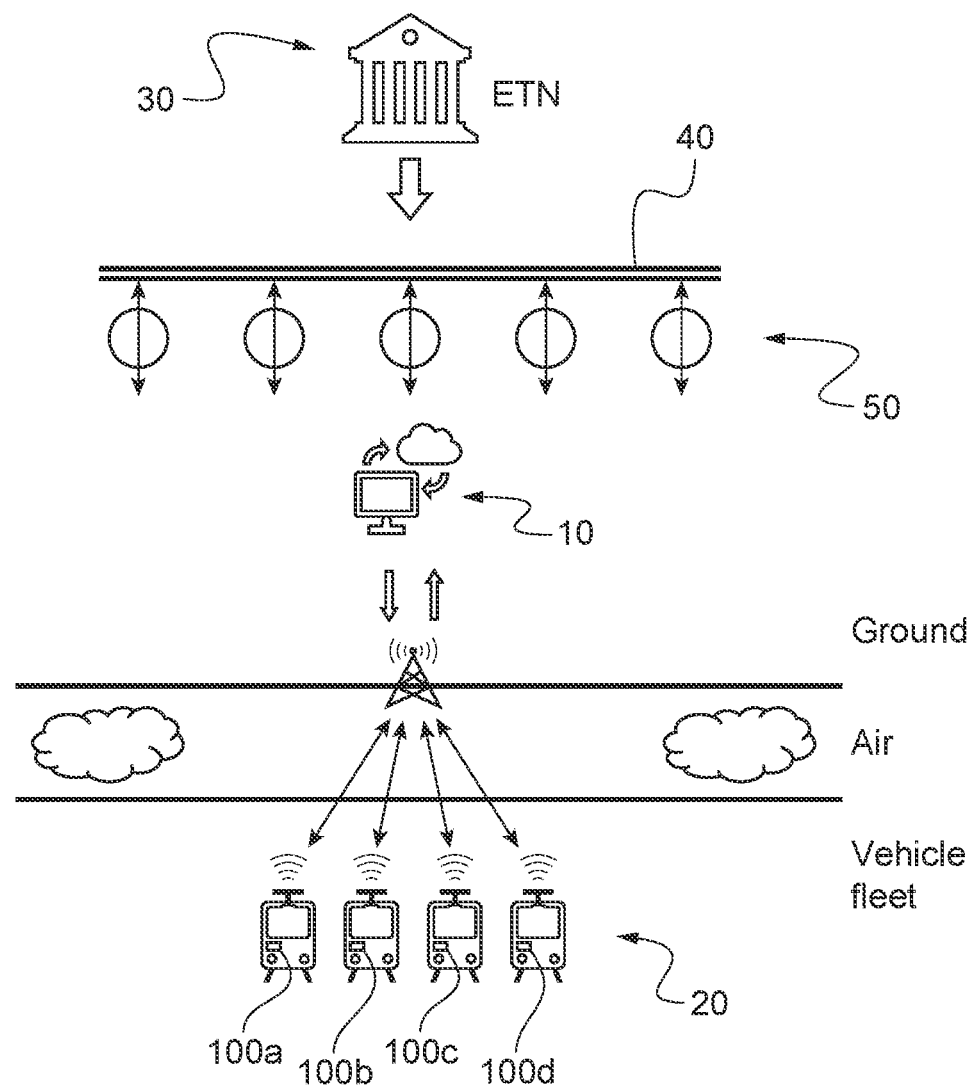
FIG. 1 is a diagram diagrammatically illustrating the context of use of the electrical energy consumption management device in accordance with an embodiment.

FIG. 1 represents the context of use of an electrical energy consumption management device 10 of a fleet or set of passenger transport vehicles 20.

In the embodiment shown the electrical energy consumption management device 10 is placed on the ground. In other embodiments, the management device may be on board a passenger transport vehicle of the fleet of vehicles.

The consumption management device 10 comprises one or more servers comprising the means necessary for the implementation of the electrical energy management methods which will be described below with reference to FIG. 2.

The electrical energy consumption management device 10 comprises communication means for communicating with servers of the company 30 managing the electricity network 40, as well as with the passenger transport vehicles of the fleet 20.

In certain situations, for example when the electrical energy consumption of the set of electricity consumers 50 is greater than the forecasts of a given moment, the company 30 managing the electricity network 40 issues an instruction for load-shedding or load management to the electricity consumers 50.

In particular, the management company 30 instructs each electricity consumer 50 to make the energy consumption have a predefined value.

The electrical energy consumption management device 10 receiving this instruction from the management company 30, implements an electrical energy consumption management method to implement, if possible, the instructed load management.

In the case of a fleet of passenger transport vehicles, the management company 30 of the electricity network 40 instructs the company exploiting the fleet of vehicles 20 to reduce the consumption of the fleet to a predefined consumption value.

In one embodiment, local control devices are placed on board the passenger transport vehicles. These local control devices are respectively associated with air conditioning systems (not shown). Each local control device is configured to measure the electricity consumption of the associated air conditioning system, and to send it to the management device 10.

These local control devices comprise conventional means for measuring the electrical energy consumption and do not need to be described here.

For example, the electrical energy consumption is measured by monitoring the activation cycles of the actuators (or contactors) of the air conditioning system. More particularly, as the power consumed by the actuators, such as the heating resistors, the fans or the compressors is known, the electrical energy consumption is known by monitoring the activation cycles of the actuators. By way of example, a heating resistor of nominal power 10 kW with an activation cycle of 30% consumes 3 kW as a smoothed average.

In this embodiment, the electrical energy consumption management device 10 and the local control devices form an electrical energy consumption management system for a set of passenger transport vehicles 20.

Figure 2:
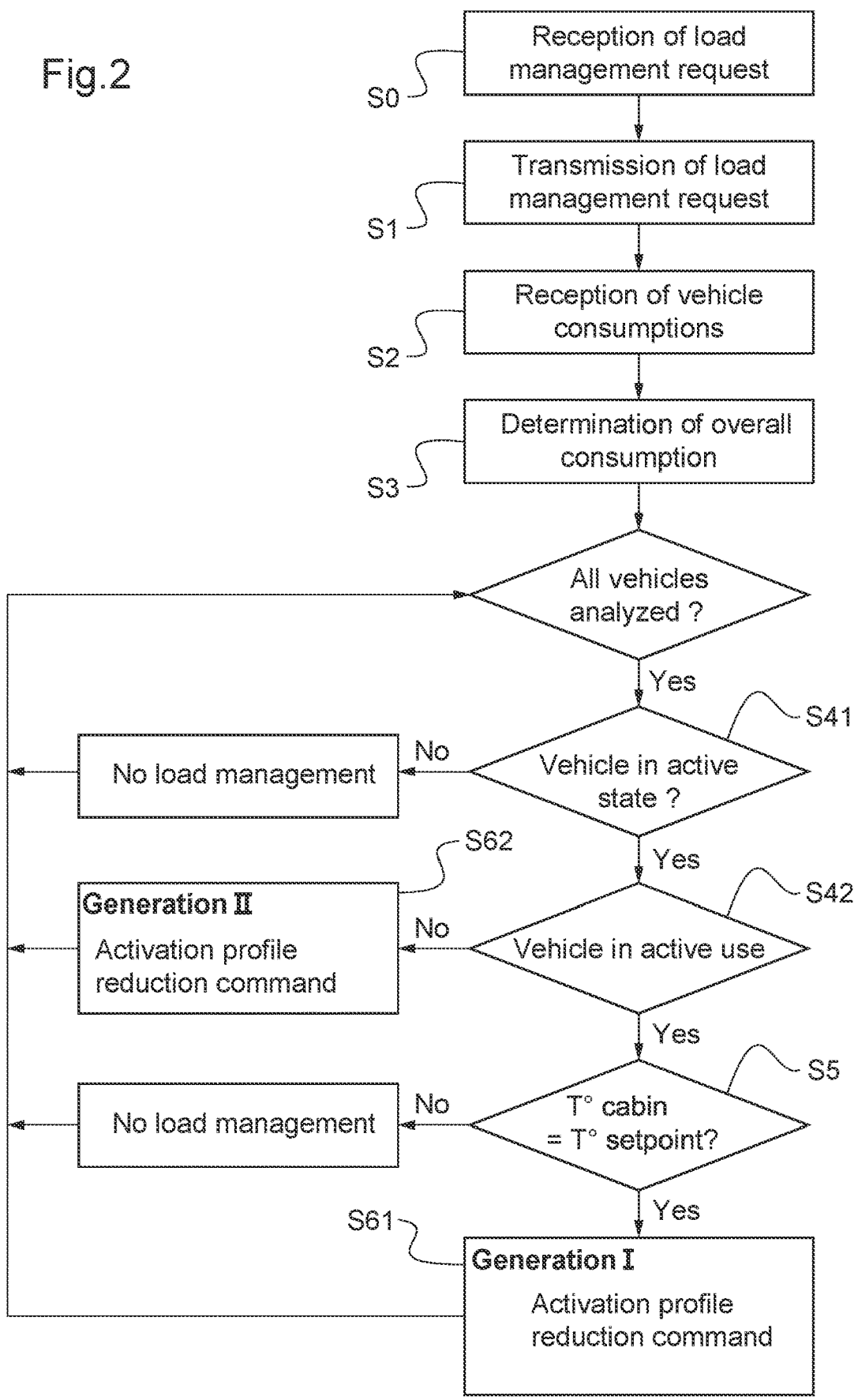
FIG. 2 illustrates steps for a management method in accordance with an embodiment of the invention, and FIG. 3 diagrammatically illustrates a management device according to one embodiment.

FIG. 2 illustrates the electrical energy consumption management method according to one embodiment.

The management method is implemented in the management device 10. An embodiment of the management device 10 will be described with reference to FIG. 3.

When the management device 10 receives an instruction or request for load management from the company 30 managing the electricity network 40, at a receiving step S0, it sends to the vehicles of the set 20, at a transmitting step S1, a request to reduce the electrical energy consumption.

In reply, the management device 10 receives from the vehicles 20, at a receiving step S2, a set of consumption information representing the electrical energy consumed, at a given instant, by the vehicles of the set 20. The management device 10 thus knows the electrical consumption of each vehicle of the set 20.

The management device 10 can thus determine, at a determining step S3, an overall consumption, at a given instant, from the set of consumption information received.

As the management device 10 knows the instructed load management, or in other words the predefined consumption value instructed by the company 30 managing the electricity network 40, as well as the overall consumption of the fleet of vehicles 20, it determines the load management to request from the fleet of vehicles. As will be understood from the description below, the load management instructed to the vehicles of the fleet 20 depends on the state of use of the vehicles 20. Thus, the management device 10 generates a set of commands in the generating steps S61, S62, that are respectively provided for a subset of vehicles selected from among the vehicles of the set according to their vehicle state of use.

The generated commands are configured to modify the operation of the air conditioning system of the vehicles of the subset, so as to reduce the value of the determined overall consumption to a predefined consumption value.

It will be noted that the management device 10 only asks to modify the operation of the air conditioning system of the vehicles belonging to the subset. The selection of the vehicles forming part of the subset will be explained below.

By modifying the operation of the air conditioning system is meant modifying the activation profile or the activation time of the actuators of the air conditioning system.

When an activation profile is reduced, or the activation time is reduced, the consumption is reduced.

It will be noted that when the activation profile is reduced, it may be that the temperature of a cabin of the vehicle does not reach the setpoint temperature or that the time to reach it is longer.

Furthermore, the more the activation profile is reduced, the greater the gap between the temperature of the cabin and the setpoint temperature.

According to one embodiment, the management device 10 checks which vehicles of the fleet 20 are active. In other words, for each vehicle of the fleet 20, it checks, at a first checking step S41, whether the vehicle is in use. In particular, at this first verifying step S41, it is verified whether the vehicle is electrically energized.

If the vehicle is not electrically energized, that is to say not in use, it does not belong to the subset of vehicles for which a command for modifying the operation of the air conditioning system is generated.

If the vehicle is electrically energized, or in other words, in use, it belongs to the subset of vehicles for which a command for modifying the operation of the air conditioning system is generated. For the vehicles belonging to this subset of vehicles, a second verifying step S42 is implemented, to verify whether the vehicle is in a passive or active state of use.

As indicated above, a passenger transport vehicle is in passive use if it is parked and/or it is not transporting passengers. A passenger transport vehicle is in active use when it transports passengers.

In one embodiment, if the vehicle is in active use, it is verified, at a step of verifying temperature S5, whether the temperature of at least one cabin of the vehicle has reached the setpoint temperature.

It will be noted that the setpoint temperature is the temperature at which said at least one cabin must be kept by the air conditioning system.

When the temperature of the cabin has not reached the setpoint temperature, that is to say when the difference between the temperature of the cabin and the setpoint temperature is typically greater than or less than 2 degrees Celsius, the vehicle is excluded from the subset of vehicles. In other words, the vehicles in active use in which the temperature of at least one cabin has not reached the setpoint temperature, do not belong to the subset of vehicles. This step makes it possible to improve the comfort of the passengers.

In short, the subset of vehicles comprises the vehicles in passive use as well as the vehicles in active use in which the temperature of at least one cabin has reached the setpoint temperature or regulation temperature.

Thus, among the subset of vehicles, a first group of vehicles and a second group of vehicles are identified by the management device 10. The first group of vehicles comprises vehicles in a passive state of use and the second group of vehicles comprises vehicles in an active state of use in which the temperature of at least one cabin has reached the setpoint temperature or regulation temperature.

The commands generated, in the generating steps S61, S62, for the vehicles in the first group of vehicles are different from those generated for the second group of vehicles.

For the identification of the groups of vehicles, or in other words, to determine which group of vehicles each vehicle of the fleet 20 belongs to, the management device 10 receives information from vehicles on the temperature of at least one cabin. This information on the temperature of at least one cabin may, according to some embodiments, comprise a temperature measured in at least one cabin of the vehicle, or a parameter indicating that a setpoint temperature has been reached in at least one cabin of the vehicle.

In one embodiment, the information on the temperature comes from the local control devices associated respectively with air conditioning systems on board the passenger transport vehicles 20. These local control devices measure, in real-time, the consumption of the air conditioning systems and in reply send the information on the temperature on reception of a load management request.

Once the control device 10 has determined whether the vehicle belongs to the first or to the second group of vehicles, it generates, at a generating step S61, S62, a command for modifying the operation of the air conditioning system so as to reduce the overall consumption of the fleet 20 to the predefined consumption value (this value depending on the load management instructed by the company 30 managing the electricity network 40). In other words, it generates a command for reduction of the activation profile of the air conditioning system.

If the command is generated for a vehicle in the first group of vehicles, that is to say that the vehicle is in passive use, the command for reduction of the activation profile is generated, at a second generating step S62, such that the gap between the temperature of the vehicle and a regulation temperature has a first predefined value. This first predefined gap value has a relatively high value, for example of the order of 5 degrees Celsius.

In certain cases, the activation profile is so reduced that the air conditioning system is deactivated.

If the command is generated for a vehicle in the second group of vehicles, that is to say that the vehicle is in active use and the setpoint temperature has been reached in said at least one cabin of the vehicle, the command for reduction of the activation profile is generated, at a first generating step S61, such that the gap between the temperature of the vehicle and a regulation temperature has a second predefined value. The second predefined value is less than the first predefined value.

This second predefined gap value has a relatively low value, for example of the order of 1 to 2 degrees Celsius.

Thus, when the vehicle belongs to the first group of vehicles, the command is generated such that the reduction in the activation profile is great. On the contrary, when the vehicle belongs to the second group of vehicles, the command is generated such that the reduction in the activation profile is moderate.

It will be noted that in certain cases, despite the commands generated for modifying the operation of the air conditioning systems, the load management instructed by the company 30 managing the electricity network 40 is not achieved. Nevertheless, a reduction in the consumption of the fleet of vehicles is, in most cases, obtained.

In one embodiment, the management device 10 is configured to issue notifications to the company 30 managing the electricity network 40 to inform it of the success in the load management procedure, and/or the level of load management obtained. Of course, if no load management is possible, the management device 10 informs the company 30 managing the electricity network 40 of this.

Figure 3:
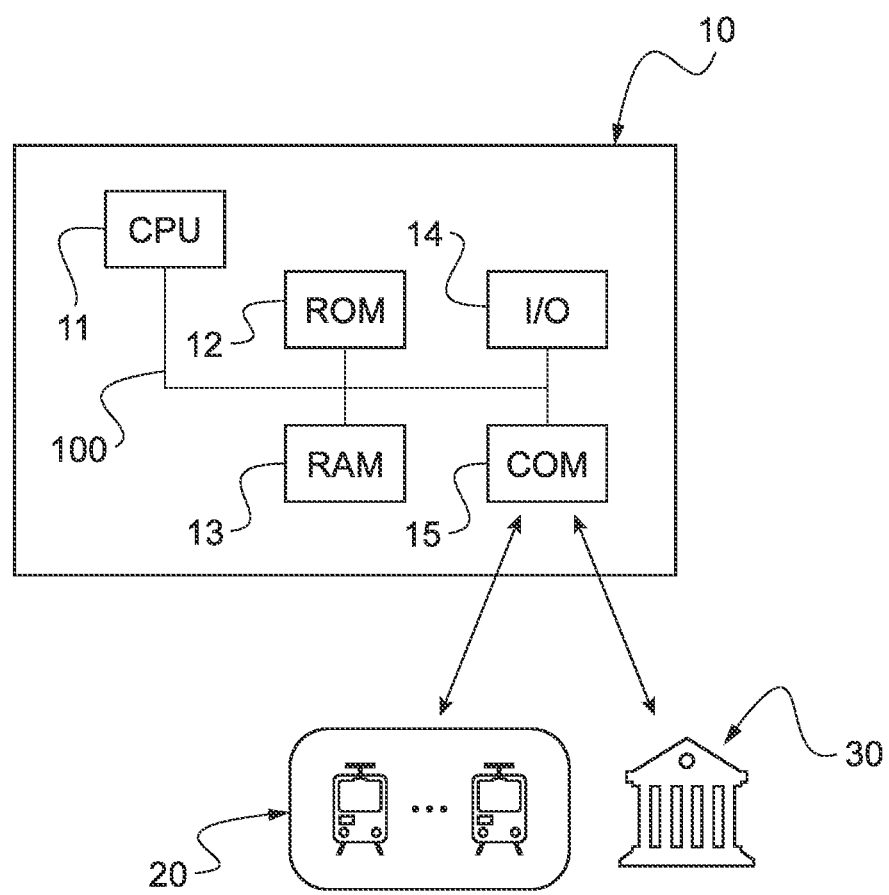

FIG. 3 is a diagrammatic representation of a management device 10 for managing the electrical energy consumption according to one embodiment.

The management device 10 for managing the electrical energy consumption is for example one or more servers incorporating the means necessary for implementing the method of managing the consumption of a fleet of vehicles 20 in accordance with the invention.

The management device 10 comprises a communication bus 100 to which are connected:
  a processing unit 11, denoted CPU (for Central Processing Unit) in the drawing and able to comprise one or more processors;
  a non-volatile memory 12, for example a ROM (for "Read Only Memory"), an EEPROM (for "Electrically Erasable Read Only Memory") or a Flash memory.
  a volatile memory 13 or RAM (for "Random Access Memory";
  an "Input/Output interface 14, denoted I/O in the drawing, for example a screen, a keyboard, a mouse or another pointing device such as a touch screen or a remote control enabling a user to interact with the system via a graphical interface; and
  a communication interface or communication means 15, denoted COM in the drawing, configured to communicate, via a network, with servers of the company 30 managing the electricity network 40 and with the passenger transport vehicles of the fleet 20

According to one embodiment, the communication means 15 of the management device 10 comprise means for receiving data from the company 30 managing the electricity network 40 and from the passenger transport vehicles. This data may for example be consumption information representing the electrical energy consumed by the vehicles of the set, requests for load management from the company 30 managing the electricity network 40, or information on the temperature of at least one cabin of the vehicle.

Furthermore, the communication means 15 of the management device 10 comprise transmission means for sending a request for reducing the electrical energy consumption provided for the vehicles of the set.

The volatile memory 13 comprises registers configured for the recording of the variables and parameters created and modified during the execution of a computer program comprising instructions for the implementation of a method according to the invention. The codes for instructions of the program stored in non-volatile memory 12 are loaded into RAM memory 13 for them to be executed by the processing unit CPU 110.

The non-volatile memory 12 is for example a re-writable memory of EEPROM type or Flash memory able to constitute a medium according to the meaning of the invention, that is to say able to comprise a computer program comprising instructions for the implementation of the management method.

The electrical energy consumption management device 10 further comprises determination means configured for determining an overall consumption at a given instant, from the set of consumption information received, and generation means configured for generating a set of commands respectively provided for a subset of vehicles selected from among the vehicles of the set 20.

The management device 10 further comprises means for selecting vehicles from among the vehicles of the fleet 20, according to their state of use and/or according to information on the temperature of at least one cabin.

Furthermore, the management device 10 comprises identification means configured for identifying, from among the subset of selected vehicles, a first group of vehicles comprising vehicles in a passive state of use and a second group of vehicles comprising vehicles in an active state of use and in which the temperature of at least one cabin has reached the setpoint temperature.

According to one embodiment, the generation means are configured to generate a first and a second group of commands for reducing the activation profile. The commands of each group are generated according to the group of vehicles for which the commands are provided.

Thus, the generation means are configured to generate a first group of commands for reduction of the activation profile of the air conditioning system provided for the first group of vehicles such that the gap between the temperature of the vehicle and a regulation temperature has a first predefined value, and a second group of commands for reduction of the activation profile of the air conditioning system provided for the second group of vehicles, such that the gap between the temperature of the vehicle and a regulation temperature has a second predefined value, the second predefined value being less than the first predefined value.

Thus, by virtue of the means described above, the management device 10 can implement the method of managing electrical energy consumption. By implementing this method, the air conditioning system of all the vehicles of a fleet are controlled taking into account the state or situation of use of the vehicles, so as to reduce the overall electrical consumption of the fleet in real-time in response to a load management request coming from the company managing the electricity network.

The invention claimed is:

1. A management device for managing electrical energy consumption of a set of vehicles, the management device comprising:
one or more processors configured to determine cabin temperatures of the vehicles and determine (a) a passive state or (b) an active state of each of the vehicles in the set, the one or more processors also configured to determine an overall consumption of electrical energy by the set of the vehicles based on (i) the cabin temperatures and (ii) the passive states or the active states of the vehicles, the one or more processors also configured to select a subset of the vehicles from the set based on ci) the cabin temperatures and (ii) the passive states or the active states of the vehicles, the one or more processors configured to change operation of air conditioning actuators of the vehicles in the subset to change the overall consumption of the set of the vehicles to a predefined value.

2. The management device of claim 1, wherein the one or more processors are configured to change the operation of the air conditioning actuators to reduce the electrical energy that is consumed by the vehicles in the sub set.

3. The management device of claim 1, wherein the passive states of the vehicles include the vehicles either being in standby or having no passengers onboard.

4. The management device of claim 1, wherein the one or more processors are configured to select the vehicles in the subset by comparing the cabin temperatures of the vehicles with a setpoint temperature.

5. The management device of claim 4, wherein the one or more processors are configured to select the vehicles in the subset as the vehicles that are in the passive state.

6. The management device of claim 4, wherein the one or more processors are configured to select the vehicles in the subset as the vehicles that are in the active state and having cabin temperatures that have reached the setpoint temperature.

7. A management system comprising:
the management device of claim 1; and
local control devices respectively associated with the air conditioning actuators onboard the vehicles, each of the local control devices configured to measure and send the cabin temperatures and the passive states or the active states to the management device that represent electrical energy consumed at a given instant by air conditioning systems of the vehicles.

8. The management device of claim 1, wherein the active states of the vehicles include the vehicles having passengers onboard.

9. The management device of claim 1, wherein the one or more processors are configured to change the operation of the air conditioning actuators by changing one or more duty cycles of the air conditioning actuators of the vehicles.

10. The management device of claim 9, wherein the one or more processors are configured to change the one or more duty cycles to bring the cabin temperatures closer to a setpoint temperature.

11. The management device of claim 1, wherein the set of the vehicles is a fleet of the vehicles.

12. A method comprising:
receiving consumption information representing electrical energy consumed by vehicles in a set, the consumption information including (a) cabin temperatures of the vehicles and (b) passive states or active states of the vehicles;
determining an overall consumption of the electrical energy by the vehicles from the consumption information that is received;
selecting a subset of the vehicles from the set based on (i) the cabin temperatures and (ii) the passive states or the active states of the vehicles; and
changing operation of air conditioning actuators of the vehicles in the subset to reduce the overall consumption vlue of the set of the vehicles to a predefined value.

13. The method of claim 12
wherein the operation of the air conditioning actuators is changed to reduce the electrical energy that is consumed by the vehicles the subset.

14. The method of claim 12, wherein the states of the vehicles include the vehicles either being in standby or having no passengers onboard.

15. The method of claim 12, wherein the vehicles are selected for the subset by comparing the cabin temperatures of the vehicles with a setpoint temperature.

16. The method of claim 15,
wherein the vehicles that are selected for the subset are selected based on the vehicles being in the passive state.

17. The method of claim 16, wherein the vehicles selected for the subset are the vehicles in the active state and that have cabin temperatures that have reached the setpoint temperature.

18. The method of claim 12, wherein the operation of the air conditioning actuators is changed by changing one or more duty cycles of the air conditioning actuators of the vehicles.

19. The method of claim 18, wherein the operation of the air conditioning actuators is changed by modifying the one or more duty cycles to bring the cabin temperatures closer to a setpoint temperature.

20. A method of centralized control of air conditioning systems of vehicles in a vehicle fleet, the method comprising:
- measuring cabin temperatures of the vehicles;
- determining whether each of the vehicles is in a passive state or an active state, the passive state involving the respective vehicle having no passengers onboard or being in standby, the active state involving the respective vehicle having the passengers onboard;
- identifying a subset of the vehicles based on (a) a comparison between the cabin temperatures of the vehicles with a setpoint temperature and (b) whether the vehicles are in the passive state or the active state; and
- changing a duty cycle of contactors in air conditioning systems of the vehicles identified as being in the subset to reduce an overall electricity consumption by the vehicles in the fleet.

* * * * *